US008041301B2

(12) United States Patent
Zuniga et al.

(10) Patent No.: US 8,041,301 B2
(45) Date of Patent: Oct. 18, 2011

(54) DISTRIBUTED RESERVATION PROTOCOL FOR ENABLING MULTI-BAND TRANSMISSION IN NEXT GENERATION ULTRA WIDE BAND TECHNOLOGY

(75) Inventors: Juan Carlos Zuniga, Montreal (CA); Sudheer A. Grandhi, Mamaroneck, NY (US); Mohammed Sammour, Montreal (CA); Catherine M. Livet, Montreal (CA); Inhyok Cha, Yardley, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 888 days.

(21) Appl. No.: 11/999,408

(22) Filed: Dec. 4, 2007

(65) Prior Publication Data
US 2009/0036063 A1 Feb. 5, 2009

Related U.S. Application Data

(60) Provisional application No. 60/868,451, filed on Dec. 4, 2006.

(51) Int. Cl.
*H04B 1/00* (2006.01)
(52) U.S. Cl. .................. 455/63.3; 455/552.1; 455/103; 455/154; 370/437
(58) Field of Classification Search ............. 455/63.3, 455/552.1, 103, 154.1, 463, 168.1, 187.1; 370/437, 458, 345, 443
See application file for complete search history.

(56) References Cited

U.S. PATENT DOCUMENTS

| 7,133,646 | B1 | 11/2006 | Miao |
| 7,610,018 | B2 * | 10/2009 | Marin et al. ............. 455/63.3 |
| 7,693,119 | B2 * | 4/2010 | Lee et al. ................. 370/338 |
| 2002/0080735 | A1 | 6/2002 | Heath et al. |
| 2005/0180314 | A1 | 8/2005 | Webster et al. |
| 2005/0232216 | A1 | 10/2005 | Webster et al. |
| 2005/0237923 | A1 | 10/2005 | Balakrishnan et al. |
| 2005/0249170 | A1 | 11/2005 | Salokannel et al. |
| 2006/0039346 | A1 * | 2/2006 | Shapiro ..................... 370/349 |
| 2007/0133483 | A1 * | 6/2007 | Lee et al. ................. 370/338 |
| 2007/0213012 | A1 * | 9/2007 | Marin et al. ............. 455/63.3 |
| 2008/0144498 | A1 * | 6/2008 | Chung et al. ............. 370/231 |
| 2008/0259877 | A1 * | 10/2008 | Habetha ................... 370/336 |
| 2009/0106810 | A1 * | 4/2009 | Stoye et al. .............. 725/131 |

FOREIGN PATENT DOCUMENTS

| RU | 41559 U1 | 10/2004 |
| WO | 2005/076544 | 8/2005 |
| WO | 2006/043242 | 4/2006 |
| WO | 2006/120648 | 11/2006 |

OTHER PUBLICATIONS

High Rate Ultra Wideband PHY and MAC Standard; ECMA International; Standard ECMA-368; $1^{st}$ Edition, Dec. 2005.
MAC-PHY Interlace for ECMA-368; ECMA International; Standard ECMA-369; $1^{st}$ Edition, Dec. 2005.

* cited by examiner

*Primary Examiner* — Minh D Dao
(74) *Attorney, Agent, or Firm* — Volpe and Koenig, P.C.

(57) ABSTRACT

An ultra wide band wireless transmit/receive unit (WTRU) communication includes a transmitter configured to transmit a first indicator of a multi-radio band transmission, and a receiver configured to receive a second indicator of a multi-radio band transmission.

8 Claims, 3 Drawing Sheets

DISTRIBUTED RESERVATION PROTOCOL FOR ENABLING MULTI-BAND TRANSMISSION IN NEXT GENERATION ULTRA WIDE BAND TECHNOLOGY

CROSS REFERENCE TO RELATED APPLICATIONS

This application claims the benefit of U.S. provisional application No. 60/868,451 filed Dec. 4, 2006, which is incorporated by reference as if fully set forth.

FIELD OF INVENTION

A method and apparatus are disclosed to enable higher data rates in ultra wide band (UWB) and expanded bandwidth transmission (EBT) communication systems.

BACKGROUND

ECMA 368/369 is a standard specification for the Physical (PHY) and Medium Access Control (MAC) layers of a High Rate Ultra Wideband (UWB) wireless communication system. ECMA 368/369 has received acceptance as a common platform for technologies such as next generation Bluetooth®, Wireless Universal Serial Bus (WUSB) and Wireless Firewire (IEEE 1394). The specification supports a MAC layer and a PHY layer that runs at data rates up to 480 Mbps. The PHY layer is designed to operate in the 3.1 to 10.6 GHz frequency spectrum.

The ECMA 368 PHY layer uses Multi-Band Orthogonal Frequency Division Multiplex (MB-OFDM) to transmit information. The operating frequency spectrum is divided into 5 radio band groups. Each radio band within a radio band group has a bandwidth of 528 MHz. The first four radio band groups have three radio bands each with a bandwidth of 528 MHz and the fifth radio band has two radio bands with a bandwidth of 528 MHz, for a total of 14 radio bands, each with a bandwidth of 528 MHz. The specification requires a device, such as a wireless transmit receive unit (WTRU) to operate in at least the first radio band group. Operating in the other radio band groups is optional.

The ECMA 386 MAC layer has a completely distributed architecture and provides MAC service to a higher layer protocol or adaptation layer. There is no central coordinating device and each WTRU in a network supports all MAC functions. Each WTRU within radio range coordinates with other WTRUs using periodic beacon frames. The beacon frames provide network timing, scheduling and capability information as well as other information and functions.

One way in which the beacon frames provide information is via an information element (IE) included in the beacon frame or in a command frame. This IE may include a beacon period (BP) switch IE and/or a distributed reservation protocol (DRP) IE. The BP switch IE, in particular, may include an element ID field, a length field, a BP move countdown field, a beacon slot offset field, and a BP start (BPST) offset field.

In addition, MAC superframe structures from ECMA 368 include beacon periods (BPs) and medium access slots (MASs).

FIG. 1 shows a typical format of a DRP IE 100 in accordance with the prior art. The DRP IE 100 may include an element ID field 102, a length field 104, a DRP Control field 106, a target/owner DevAddr field 108, and a series of DRP allocation fields 110.

ECMA 368/369 supports data rates up to 480 Mbps. These rates are inadequate to support applications such as high definition TV (HDTV), which requires data rates of 1 Gbps or greater depending on the format. It would therefore be desirable to have a UWB system with both PHY an MAC layers that support high data rates (1 Gbps and above).

SUMMARY

A method and apparatus are disclosed for increasing data rates in a UWB/EBT distributed communication system. The bandwidth may be increased by using multiple communication radio bands and indicating multi-radio band transmission in an information element.

BRIEF DESCRIPTION OF THE DRAWINGS

A more detailed understanding may be had from the following description, given by way of example and to be understood in conjunction with the accompanying drawings wherein.

DETAILED DESCRIPTION

When referred to hereafter, the terminology "wireless transmit/receive unit (WTRU)" and a device (DEV) includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

A wireless communication system may include a plurality of wireless communication devices, such as a plurality of WTRUs, user equipment (UE), or DEVs, capable of wirelessly communicating with one another. The wireless communication system may comprise any combination of APs, Node Bs, WTRUs, DEVs, and the like. For example, the wireless communication system may include WTRUs operating in ad-hoc mode, nodes acting as wireless bridges, or any combination thereof.

Figure 1:
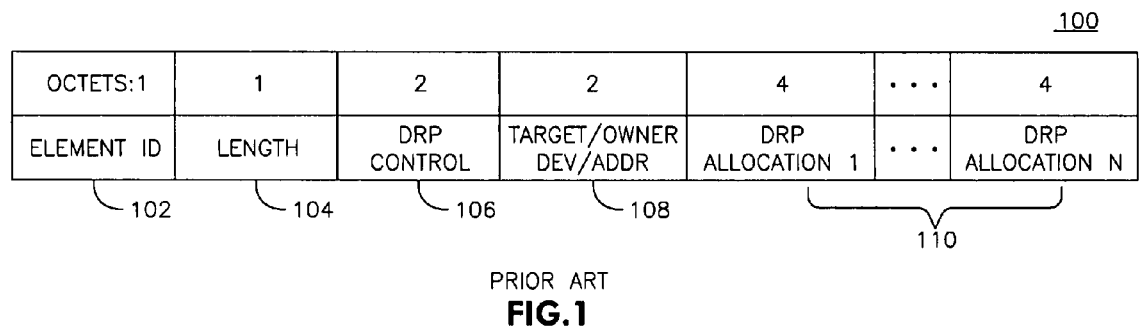
FIG. 1 shows a DRP IE in accordance with the prior art.
Figure 2:
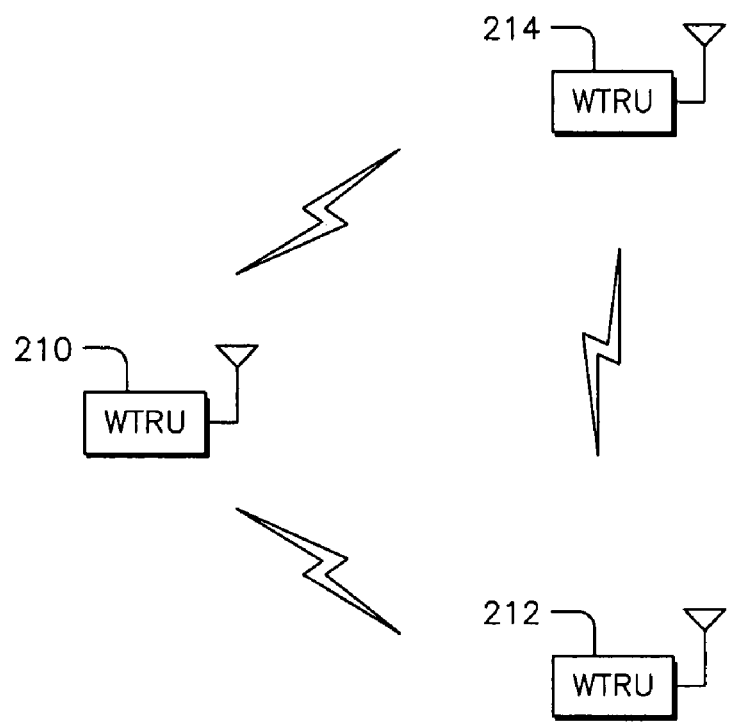
FIG. 2 shows a distributed wireless communication network in accordance with one embodiment.

FIG. 2 shows a distributed wireless communication network 200 in accordance with one embodiment. WTRU 1 210, WTRU 2 212 and WTRU 3 214 may communicate with each other directly or indirectly, without the use of a central hub. The bandwidth of the system 200 may be expanded by each WTRU (810, 812, 814) communicating using multiple adjacent or non-adjacent radio bands, in either a single radio application or a dual radio application.

When each WTRU (210, 212, 214) transmits, it makes a reservation of the medium. In order to do this, a DRP IE is transmitted, via a Beacon/Command frame, in all radio bands of an expanded bandwidth transmission (EBT) WTRU (210, 212, 214). The WTRU (210, 212, 214) typically transmits the DRP IE in each of the radio bands announcing the medium access slots (MASs) where the transmission will take place. If the MASs are simultaneous, the radio can make one single transmission over the entire expanded bandwidth. If the radio bands are adjacent radio bands, a single radio may be used by the WTRU (210, 212, 214). This is feasible if the DRP IE transmissions take place in sequential order.

Several explicit DRP IEs may be transmitted over different channels to inform single channel users, such as those using legacy devices, about the transmission over their specific channel. If all neighboring devices have similar capabilities and support the EBT mode, a single DRP IE over a main or default channel is sufficient, thus making an implicit reservation over the EBT.

The DRP IE may include a Reservation Type field that supports an expanded bandwidth transmission. As shown in TABLE 1, for EBT, a 3-bit field may be used to indicate eight (8) reservation types, such as Expanded-Hard, Expanded-Soft, Dual-Channel-Hard, Dual-Channel-Soft, Multi-Channel-Hard, and Multi-Channel-Soft, for example.

TABLE 1

3-bit reservation type field

| Value | Reservation Type |
|---|---|
| 0 | Alien BP |
| 1 | Hard |
| 2 | Soft |
| 3 | Private |
| 4 | PCA |
| 5 | Dual-band Hard |
| 6 | Dual-band Soft |
| 7 | Tri-band Hard |

A WTRU may be configured to operate in a dynamically configurable network where the configuration may alternate among two or more different modes, such as Hard, Soft, or Private, in single, dual, or multi-channel settings. The WTRU may determine its configuration by sensing channel and traffic conditions. Alternatively, the WTRU may determine its configuration by a programmed design.

Allowing a WTRU to operate in more than two radio bands and dynamically change its operating mode may create a relatively large number of reservation types. In order to support the relatively large number of reservation types, the reservation type field may be expanded to use more than three (3) bits, resulting in greater than eight (8) total values.

TABLE 2 shows an example of an expanded reservation type field in accordance with one embodiment. The reservation type field uses four (4) bits, resulting in 16 possible values for the field. Values may be included that represent single and multiple radio band transmissions. As shown in TABLE 2, values 0 through 4 indicate single radio band transmission, values 4 through 8 and 13 indicate dual radio band transmission and values 9 through 12 and 14 indicate tri-band transmission. Value 15 is reserved for future use.

TABLE 2

4-Bit Reservation Type

| Value | Reservation Type |
|---|---|
| 0 | Alien BP |
| 1 | Single-band Hard |
| 2 | Single-band Soft |
| 3 | Single-band Private |
| 4 | Single-band PCA |
| 5 | Dual-band Hard |
| 6 | Dual-band Soft |
| 7 | Dual-band Private |
| 8 | Dual-band PCA |
| 9 | Tri-band Hard |
| 10 | Tri-band Soft |

TABLE 2-continued

4-Bit Reservation Type

| Value | Reservation Type |
|---|---|
| 11 | Tri-band Private |
| 12 | Tri-band PCA |
| 13 | Dual-band Dynamic |
| 14 | Tri-band Dynamic |
| 15 | Reserved |

The expanded DRP IE reservation type field may be used to indicate non-adjacent radio bands. If the radio bands are non-adjacent, if the radio bands are within the FFT (fast Fourier transform) size of the receiver, and if some of the carriers that are used for the transmission occupy the non-adjacent radio bands, a single radio may be used. However if the reservation of the MAS is not successful for all radio bands, the EBT WTRU can operate in a limited or legacy mode or use only the FFT carriers that correspond to the successfully reserved bandwidth.

If the radio bands are non-adjacent and not sufficiently close, the WTRU may use multiple radios. If the reservation is successful of the MAS, then the EBT WTRU may operate in EBT mode. The EBT WTRU may retransmit a beacon until the WTRU is successful on all radio bands of the EBT. When the EBT WTRU relinquishes resources, reservation termination methods are applied to all EBT radio bands.

In a single channel system, MAS's may be considered time resources over a single channel or an expanded channel. The MAS's can be reserved for a simultaneous transmission over a specified superframe.

Figure 3:
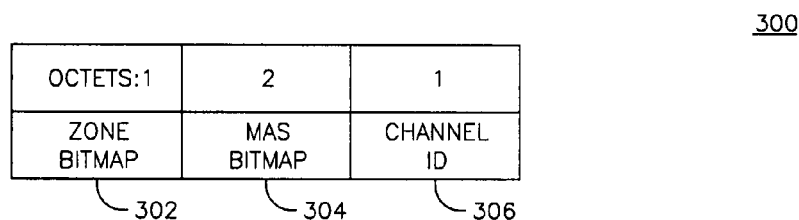
FIG. 3 shows a DRP allocation field in accordance with one embodiment.

The DRP IE may be used for channel reservations over multiple radio bands. The channel number information may be placed in a DRP IE by including channel information in a DRP Allocation Field of a DRP IE. FIG. 3 shows a DRP allocation field 300 in accordance with one embodiment. The DRP allocation field 300 includes a single octet for the zone bitmap 302, 2 octets for the MAS bitmap 304 and one octet for the Channel ID 306.

Figure 4:
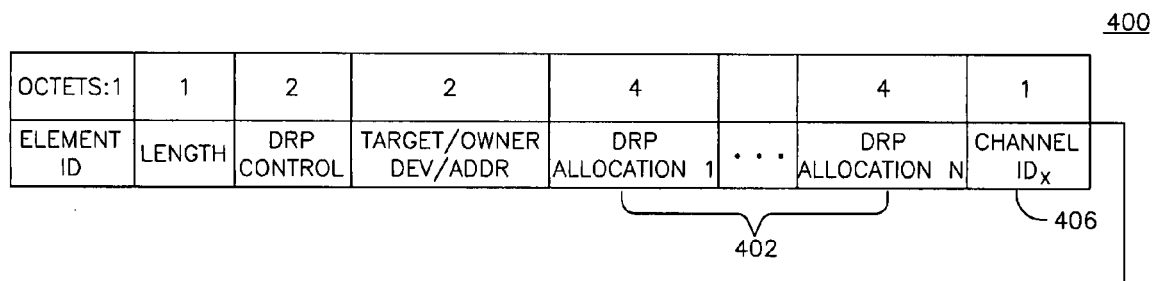
FIG. 4 shows embedded channel information in a Channel ID field in accordance with one embodiment.
Figure 4:
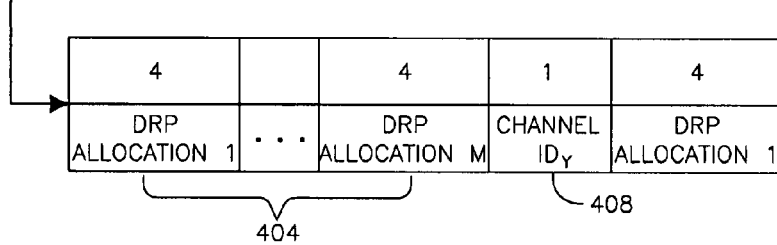

Channel information may also be included in a Channel ID field that is placed before a series of DRP allocation elements in a DRP IE. FIG. 4 shows embedded channel information in a Channel ID field 400 in accordance with one embodiment. The first channel ID can be omitted, assuming that the first series of allocations 402 corresponds to the default channel. The next series of allocations 404 follows a channel ID element 406. As few as 4 bits are needed to identify all of the current 14 UWB channels. Alternatively, a 2-byte bitmap can be used to identify all the possible channel combinations that can be used in the expanded bandwidth.

Although the features and elements are described in particular combinations, each feature or element can be used alone without the other features and elements or in various combinations with or without other features and elements. The methods provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. An expanded bandwidth transmission (EBT) capable wireless transmit/receive unit (WTRU) comprising:
    a transmitter configured to transmit a first indicator of a multi-radio band transmission;
    a receiver configured to receive a second indicator of a multi-radio band transmission; and
    a processor configured to adjust a reservation of a medium access slot (MAS) based on a plurality of channel and traffic conditions;
    wherein the first indicator and the second indicator each comprise an information element comprising a reservation type field, the information element including:
        information for reserving a communication channel over multiple radio bands according to a distributed reservation protocol (DRP), and
        a plurality of channel identifiers, each channel identifier placed beside a series of associated DRP channel allocations.

2. The WTRU as in claim 1 wherein the reservation type field comprises an indication of a multi-radio band transmission.

3. The WTRU as in claim 1 wherein the channel identifier is associated with a DRP allocation field.

4. The WTRU as in claim 1 further comprising more than one radio.

5. The WTRU as in claim 1 wherein the WTRU is configured to operate with either one radio or more than one radio based on a position of a plurality of communication radio bands.

6. A method of expanded bandwidth transmission comprising:
    a wireless transmit/receive unit (WTRU) transmitting a first indicator of a multi-radio band transmission over multiple communication radio bands;
    the WTRU receiving a second indicator of a multi-radio band transmission; and
    adjusting a reservation of a medium access slot (MAS) based on a plurality of channel and traffic conditions;
    wherein the first indicator and the second indicator each comprise an information element comprising a reservation type field, the information element including:
        information for reserving a communication channel over multiple radio bands according to a distributed reservation protocol (DRP), and
        a plurality of channel identifiers, each channel identifier placed beside a series of associated DRP channel allocations.

7. The method as in claim 6 wherein the reservation type field comprises an indication of a multi-radio band transmission.

8. The method as in claim 6 wherein the channel identifier is associated with a DRP allocation field.

* * * * *

UNITED STATES PATENT AND TRADEMARK OFFICE
CERTIFICATE OF CORRECTION

| | | |
|---|---|---|
| PATENT NO. | : 8,041,301 B2 | Page 1 of 1 |
| APPLICATION NO. | : 11/999408 | |
| DATED | : October 18, 2011 | |
| INVENTOR(S) | : Zuniga et al. | |

It is certified that error appears in the above-identified patent and that said Letters Patent is hereby corrected as shown below:

ON THE TITLE PAGE

Item (56) OTHER PUBLICATIONS, page 1, right column, third line after "MAC-PHY", delete "Interlace" and insert --Interface--.

Item (56) OTHER PUBLICATIONS, page 1, right column, after line "ECMA-369; 1st Edition, Dec. 2005.", insert --GENTRIC, "RTSP Stream Switching," Internet Engineering Task Force, Internet Draft (January 2004).--.

Signed and Sealed this
Fifteenth Day of May, 2012

David J. Kappos
*Director of the United States Patent and Trademark Office*